(12) United States Patent
Reinpoldt et al.

(10) Patent No.: US 9,235,919 B2
(45) Date of Patent: Jan. 12, 2016

(54) SYSTEM AND METHOD OF IDENTIFYING CONCEALED OBJECTS USING ANTHROPOMORPHIC DISPLAY

(75) Inventors: Michael A. Reinpoldt, Windermere, FL (US); Willem H. Reinpoldt, III, Tarpon Springs, FL (US)

(73) Assignee: THERMAL MATRIX USA, LLC, Tampa, FL (US)

( * ) Notice: Subject to any disclaimer, the term of this patent is extended or adjusted under 35 U.S.C. 154(b) by 1085 days.

(21) Appl. No.: 13/176,832

(22) Filed: Jul. 6, 2011

(65) Prior Publication Data

US 2013/0012315 A1    Jan. 10, 2013

(51) Int. Cl.
*G06T 15/00* (2011.01)
*G01V 8/00* (2006.01)

(52) U.S. Cl.
CPC .. *G06T 15/00* (2013.01); *G01V 8/00* (2013.01)

(58) Field of Classification Search
CPC .......... G06K 9/00335; G06K 9/00342; G06K 9/00362; G06K 9/00496; G06K 9/2081; G06F 3/017; G06F 3/011; G06F 3/005; H04N 5/147; G01T 17/20; G01T 19/006; G01T 15/08; G01T 17/00; G01T 19/00; G01T 2207/10081; G01T 2207/30032; G01T 2207/30064; G01T 7/0012; G01T 7/0081; G01T 15/02; G01T 2210/62; G01T 2210/41; G01T 7/2033; G01T 2207/30204
USPC ......................................................... 345/420
See application file for complete search history.

(56) References Cited

U.S. PATENT DOCUMENTS

| | | | |
|---|---|---|---|
| 2006/0066469 A1* | 3/2006 | Foote et al. ..................... 342/22 |
| 2008/0027791 A1* | 1/2008 | Cooper .......................... 705/11 |
| 2008/0180439 A1* | 7/2008 | Adabala et al. ............... 345/421 |
| 2009/0297039 A1* | 12/2009 | Reinpoldt et al. ............ 382/209 |

OTHER PUBLICATIONS

Salah et al., Expressive anatomical illustrations based on scanned patient data, GMS CURAC. 2006; 1:Doc09.*

* cited by examiner

*Primary Examiner* — Haixia Du
(74) *Attorney, Agent, or Firm* — Matthew G. McKinney, Esq.; Allen, Dyer, Doppelt, Milbrath & Gilchrist, P.A.

(57) ABSTRACT

A system and method of identifying concealed objects using an anthropomorphic display is disclosed. In a particular embodiment, the method includes displaying a software 3-D avatar on a visual display when an individual is detected within a scanning area, where the 3-D avatar is an anthropomorphic representation of the individual. The method also includes scanning the individual with a plurality of concealed object detection sensors viewing the scanning area and identifying at least one area on the individual in response to detecting a concealed object on the individual, where the at least one area in which the concealed object is detected on the individual is visually indicated at a corresponding location on the software 3-D avatar with a computer generated highlight. In addition, the software 3-D avatar is dimmed, modified with text, graphics, colors, textures, opacity, transparency, or any combination thereof, when no individuals are detected in the scanning area.

20 Claims, 5 Drawing Sheets

SYSTEM AND METHOD OF IDENTIFYING CONCEALED OBJECTS USING ANTHROPOMORPHIC DISPLAY

I. FIELD

The present invention relates in general to the fields of concealed object detection and graphical user interfaces (GUIs) and in particular to a method and system for identifying concealed objects using an anthropomorphic display.

II. DESCRIPTION OF RELATED ART

Graphical user interfaces (GUIs) have become a standard method of interfacing to computer systems. GUIs are traditionally comprised of various elements such as buttons, controls, windows, pull-down menus and the like. These elements greatly simplify user interface to computers compared to text based interfaces, allowing actions to be performed through direct manipulation of the graphical elements, and operator displays to be readily observed and discerned by graphical representations.

GUIs which display multiple windows for multiple sensor displays, particularly multiple video feeds in video security monitoring applications, present a copious work load for the operator responsible for monitoring each sensor display, especially as the quantity of sensor displays increase. The operator is burdened with the responsibility of examining multiple display windows simultaneously or interrogating the multiple display windows consecutively and continually. This is a concentration-intensive and error prone task, especially for extended time spans.

GUIs of the type mentioned in the previous paragraph can be found in numerous and diverse applications including process monitoring for the chemical industry, surveillance camera monitoring for the security industry, and patient monitoring for the healthcare industry to name a few. In these applications, the visual data monitored may be video imagery, graphic data representations (charts, level indicators, read-outs), waveforms (heart rate, blood pressure over time) or some other visual data. In most cases, the multiple sensor displays require the operator to divide their attention amongst the individual displays to achieve a full description and awareness of the status of the application monitored.

GUIs which display spatial information of data locations about the human body can be found in numerous and diverse applications including medical scanning, 2-D to 3-D motion conversion for computer graphics and height indication of metallic objects used in zone-based walk-through metal detectors. These displays typically provide 2-D sliced data representations at discrete intervals throughout the 3-D space or a simple 2-D location display. For example, the height indication of metallic objects detected by a zone-based walk-through metal detector displays the height of the detected object in terms of legs, pelvis, torso or head areas, without further spatial refinement.

However, no adequate method has been provided for projecting algorithmically determined data from multiple sensors in 3-D space using an anthropomorphic representation to address privacy concerns of an individual being scanned for concealed objects.

Another need exists in the art for projecting algorithmically determined data from multiple sensors using an anthropomorphic display which indicates the spatial coordinates of features of interest on the individual being scanned.

However, in view of the prior art at the time the present invention was made, it was not obvious to those of ordinary skill in the pertinent art how the identified needs could be fulfilled.

III. SUMMARY

In a particular embodiment, a method and system of identifying concealed objects using an anthropomorphic display is disclosed. The method and system include displaying a software 3-D avatar on a visual display when an individual is detected within a scanning area, where the 3-D avatar is an anthropomorphic representation of the individual. The 3-D avatar generally includes a head, torso, two legs and two arms to represent a human. In addition, the method and system includes scanning the individual with a plurality of concealed object detection sensors viewing the scanning area and identifying at least one area on the individual in response to detecting a concealed object on the individual, where the at least one area in which the concealed object is detected on the individual is visually indicated at a corresponding location on the software 3-D avatar with a computer generated highlight. The software 3-D avatar may be dimmed, modified with text, graphics, colors, textures, opacity, transparency, or any combination thereof, when no individuals are detected in the scanning area. The software 3-D avatar may also be hidden or minimized when no individual is detected within the scanning area. The computer generated highlights may include a color, intensity, density, opaqueness, flash rate, or any combination thereof, to indicate the concealed object was detected on the individual and where. The method and system may also include identifying at least one inconclusive area on the individual where it is uncertain whether the concealed object is present. The inconclusive area may be indicated at the corresponding location on the software 3-D avatar using a computer generated contrasting color, intensity, density, opaqueness, flash rate, or any combination thereof. The inconclusive area is typically an area of incomplete sensor coverage, viewing occlusion, partial viewing, obstructions or any combination thereof.

The disclosed method and system is an approach for displaying sensor data in a novel fashion, primarily for concealed object detection systems where typically multiple video feeds displayed simultaneously for an operator's assessment can be concentration intensive and error prone. The method and system further include indicating the presence of algorithmically detected sensor features and display the results via computer generated highlights projected onto the anthropomorphic software 3-D avatar using techniques including, but not limited to, intensity, 2-D or 3-D spatial location, size, shape, texture, density and contrast. The results may be located 360 degrees around the software 3-D avatar including the far side of the figure, by varying the opacity and/or transparency of the 3-D avatar and/or feature highlights.

The method and system may include presenting, either manually or automatically, multiple anthropomorphic software 3-D avatars in the same or different displays should the sensor data algorithmically determine that multiple subjects are present within the sensor range of one or more sensors. The anthropomorphic software 3-D avatars may be manipulated by controlling display characteristics including, but not limited to, rotation, scaling, zoom and translation.

The method and system may include the ability to passively point to ("mouse over") or actively select ("click") one or more features indicated by highlights on the software 3-D avatar to invoke an additional action such as displaying the data of the sensor(s) involved with generating that specific displayed feature highlight. In addition, the method and system may include the ability to passively point to ("mouse over") or actively select ("click") one or more features indicated by highlights on the software 3-D avatar in order to manually input data pertinent to the specific displayed feature(s) including, but not limited to, assessment of importance, dismissal of the feature as a feature of interest, and alarming of the feature for subsequent and/or immediate action.

In another particular embodiment, a non-transitory processor readable medium having processor instructions that are executable to cause a processor to display a software 3-D avatar on a visual display when an individual is detected within a scanning area, where the 3-D avatar is an anthropomorphic representation of the individual is disclosed. Further, the processor readable medium may include processor instructions to cause the processor to scan the individual with a plurality of concealed object detection sensors viewing the scanning area and identify at least one area on the individual in response to detecting a concealed object on the individual, where the at least one area in which the concealed object is detected on the individual is visually indicated at a corresponding location on the software 3-D avatar with a computer generated highlight.

One particular advantage provided by the embodiments is that algorithmically derived information from one or more sensors can be projected or otherwise displayed on an software 3-D avatar for 2-D and/or 3-D visual representation of the data or a subset thereof without invading the privacy of an individual being scanned for concealed objects.

Another particular advantage provided by the embodiments is that algorithmically derived information from one or more sensors projected or otherwise displayed on the far side of the software 3-D avatar can be realized using display pixels of varying opacity and transparency, thereby allowing the viewing of otherwise partially and/or completely occluded features.

Another particular advantage provided by the embodiments is that multiple software 3-D avatars can be manually and/or automatically displayed consecutively or simultaneously to represent distinct subjects or objects of interest in the same sensor range of one or more sensors.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
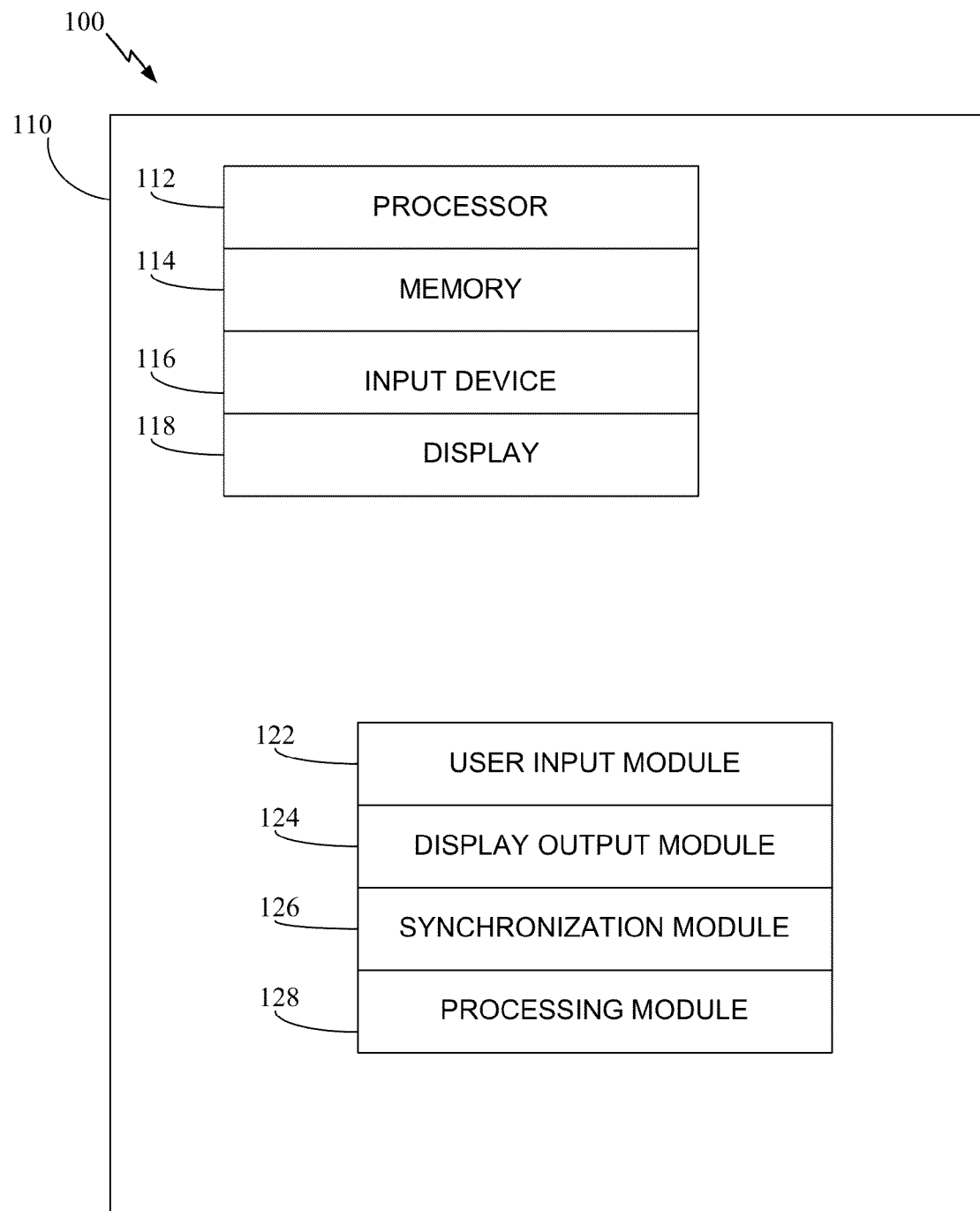
FIG. 1 is a block diagram of a particular embodiment of a computing system of the method and system for identifying concealed objects using an anthropomorphic display.

As disclosed below, the invention is a new methodology for by combining computer generated highlights of algorithmically determined features derived from data of one or more concealed object detection sensors into one or more 2-D or 3-D anthropomorphic software 3-D avatar displays.

In one embodiment, the invention will display concealed object detection results of one or more infrared imagers. These imagers may be viewing predominantly the same field of view, allowing broad spectrum imaging of the scene in multiple frequency bands, or viewing different views of the same viewing area such as front and back views or 360 degree viewing of the same viewing area at some exact or approximate viewing angle increment.

One example of the above referenced embodiment would be 90 degree increment imaging of the same viewing area implemented by arranging four infrared imagers in an inwardly pointing circle around the viewing area. In this embodiment, the operator would normally be required to view four image displays simultaneously. The invention can reduce this requirement to a single anthropomorphic software 3-D avatar display which is the projection of the algorithmically determined concealed object result highlights of all four sensors about a 3-D representation of a person in the field of view of the sensors.

In operation of the above referenced embodiment, a software 3-D avatar would display the combined sensor results of some or all sensors viewing the same scene. The display of the software 3-D avatar may be hidden when no subject is detected within the scene, with the display appearing only when a subject is detected. Alternately, the display of the software 3-D avatar may be dimmed or otherwise modified with text, graphics, colors, textures, opacity, transparency or some other attribute to indicate that no subjects are detected in the scene, with the display achieving its active appearance once a person is detected. Alternately, the display of the software 3-D avatar may be minimized and/or shrunken when no subject is detected within the scene, with the display achieving its maximized appearance only when a subject is detected. In this discussion, detection of the presence of a subject within the scene may be achieved algorithmically from the existing sensor data, via additional sensors implemented in hardware, via some other means, or some combination of these techniques.

The software 3-D avatar displays an anthropomorphic representation of a subject within the sensor area. Areas of the software 3-D avatar would reflect the algorithmic results of the concealed object detection. For example, areas in which concealed objects were detected may be indicated with computer generated highlights that have a particular color, intensity, density, opaqueness, flash rate, other attribute, or some combination of attributes. Areas in which concealed objects were not detected may be left undistinguished or similarly indicated with computer generated highlights of a contrasting color, intensity, density, opaqueness, flash rate, other attribute, or some combination of attributes. Areas in which it is inconclusive whether or not a concealed object is present may be left undistinguished or similarly indicated with computer generated highlights of a contrasting color, intensity, density, opaqueness, flash rate, other attribute, or some combination of attributes. Inconclusive areas may be the result of incomplete sensor coverage, viewing occlusions, partial viewing, obstructions or some combination thereof.

The software 3-D avatar would include an indication that a result highlight is on the far side of the software 3-D avatar (occluded by the software 3-D avatar itself) and provide a mechanism for rotating the software 3-D avatar for complete viewing or the software 3-D avatar may be rendered using a semi-transparent representation allowing viewing of result highlights without the rotational requirement. Additionally, foreground result highlights may similarly be rendered semi-transparently thus preventing foreground result highlight from occluding background highlights.

In another embodiment, additional software 3-D avatars would be displayed corresponding to the appearance of additional subjects within the sensor area.

A block diagram of a particular embodiment of a system for an anthropomorphic display is disclosed in FIG. 1 and generally designated 100. The system 100 includes a computing device 110 having at least one processor 112 and a memory 114 that is accessible to the processor 112. The memory 114 includes media that is readable by the processor 112 and that stores data and program instructions of software modules that are executable by the processor 112.

Additionally, the computing device 110 having at least one means of user input 116, either keyboard, mouse, light pen, track ball, track pad, joy stick, graphics tablet, touch screen, or other GUI input device or any combination thereof that is accessible to the processor 112.

The computing device 110 includes at least one means of user display 118, either a cathode ray tube (CRT) display, liquid crystal display (LCD), light emitting diode (LED) display, plasma display, or other GUI display device that is accessible to the processor 112.

Further, the processor 112 executes software residing in memory 114 which monitors, processes and reacts to user input from the input device 116 using a user input software module 122, displays screen pointer movements and GUI elements to the output device 118 using a display output software module 124, synchronizes the user pointer input actions to the GUI output actions using a synchronization software module 126, and processing the combined GUI actions using a processing software module 128.

Figure 2:
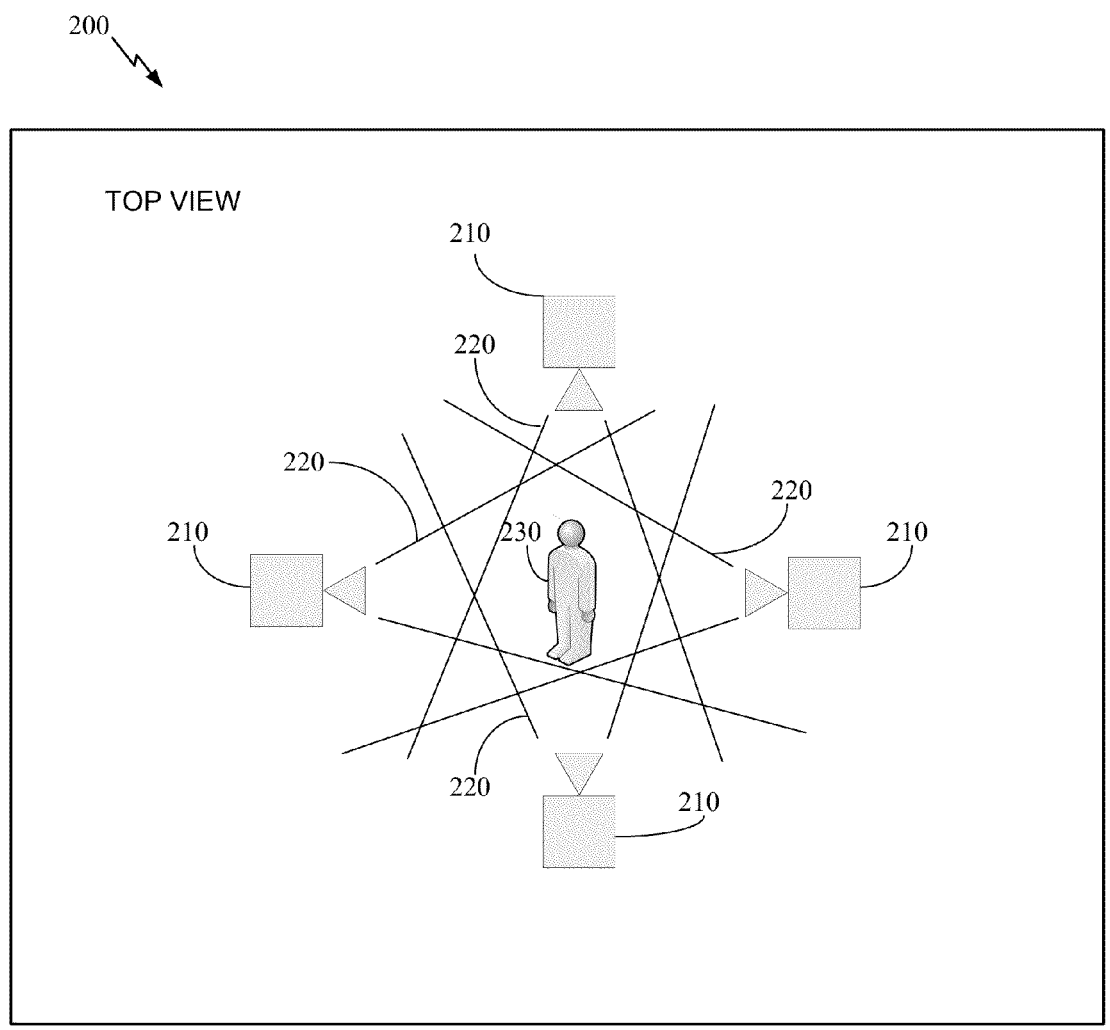
FIG. 2 is a top view diagram of a particular illustrative embodiment of four concealed object detection sensors system with the sensors positioned evenly about a circle viewing inwards at a subject.

Referring now to FIG. 2, a particular illustrative embodiment of the system is disclosed. The disclosed system is generally designated 200. The disclosed system 200 in the present figure represents a four sensor deployment and is comprised of four infrared sensors 210 arranged evenly in a circle imaging inwards, each with overlapping fields of view 220. An individual subject 230 is positioned at the center of the circle. The data from different views of the sensors 210 is algorithmically evaluated by the processing module (128 of FIG. 1). In other embodiments there may be fewer or greater quantities of sensors.

Figure 3:
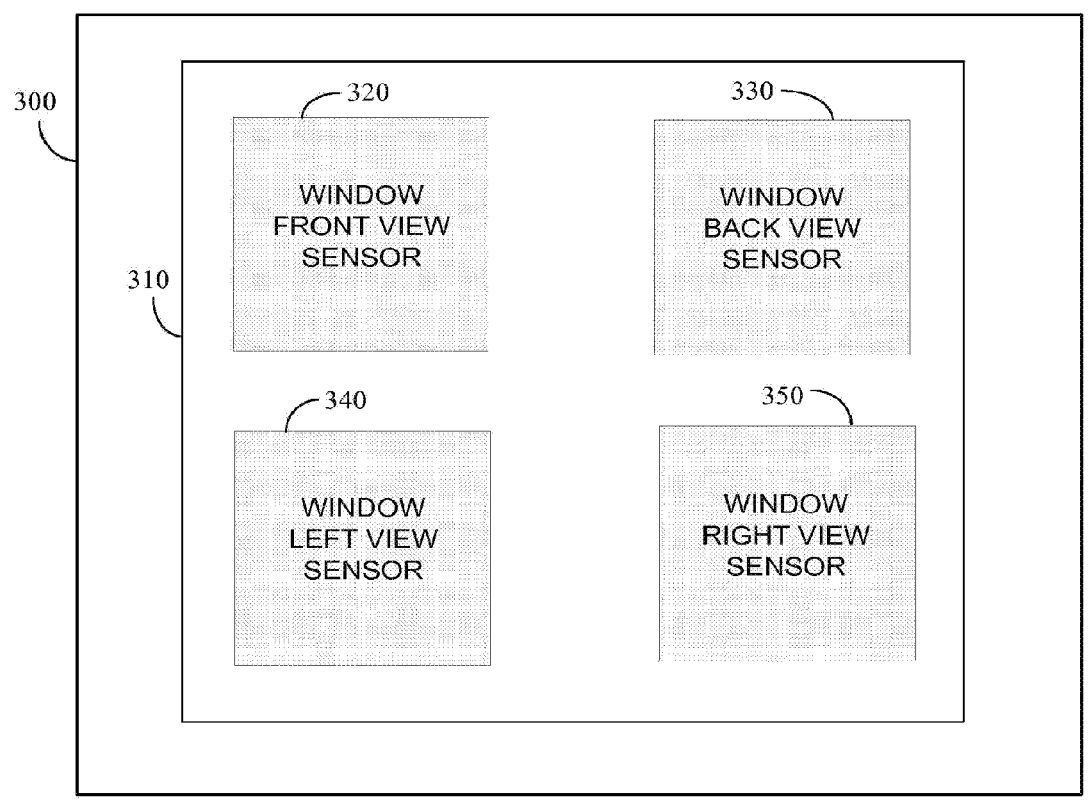
FIG. 3 is a diagram of a particular illustrative comparative embodiment of a legacy GUI which does not incorporate the invention and instead employs multiple independent windows for display of the sensor data and algorithmic results.

Referring now to FIG. 3, a particular illustrative embodiment of a graphical user interface (GUI) generally designated 300. The disclosed GUI 300 is comprised of the boundaries of the output device 310 within which are displayed four windows (320, 330, 340, 350) presenting the data from the four infrared sensors 210. The windows are arranged in a non-overlapping fashion so that no data is occluded by other windows. In particular, window 320 displays the sensor data of the front view of the subject, window 330 displays the sensor data of the back view of the subject, window 340 displays the sensor data of the left view of the subject and window 350 displays the sensor data of the right view of the subject. FIG. 3 illustrates then the division of attention an operator experiences when compelled to view multiple windows of sensor data simultaneously and continually.

Figure 4:
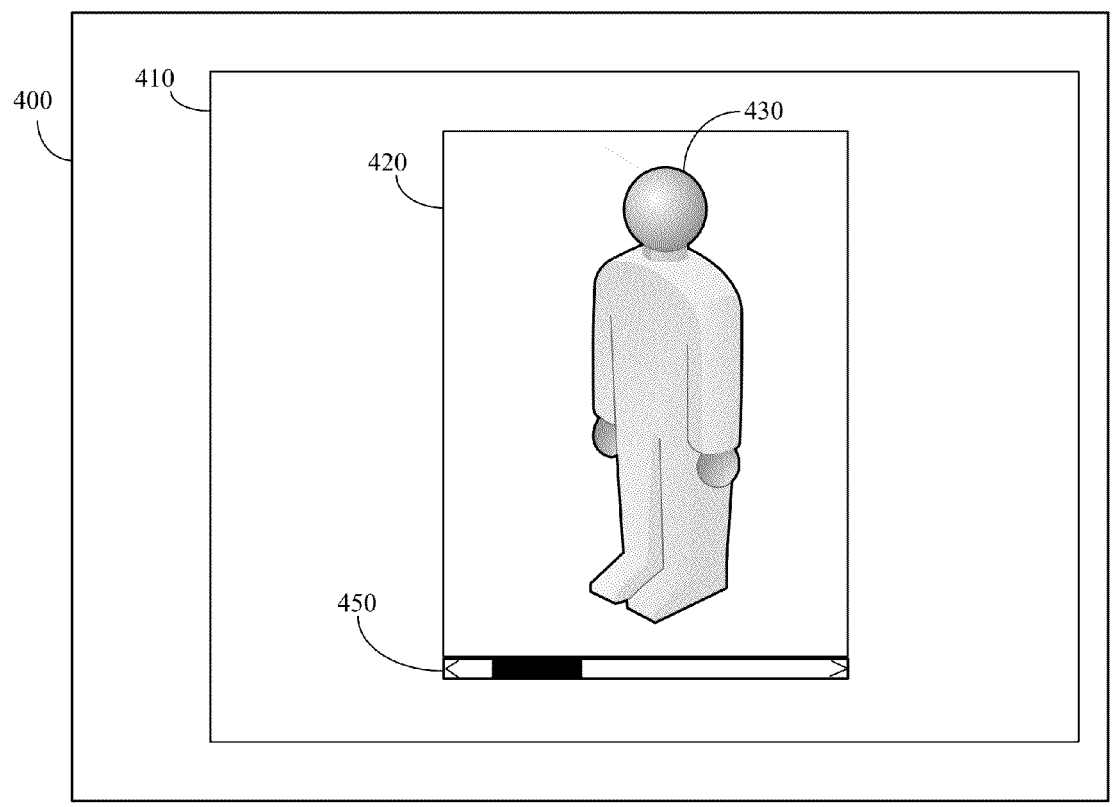
FIG. 4 is a diagram of a particular illustrative embodiment of a GUI incorporating the invention and showing the anthropomorphic display.

Referring now to FIG. 4, a particular illustrative embodiment of a graphical user interface generally designated 400 and depicting the anthropomorphic display. The disclosed GUI 400 is comprised of the boundaries of the output device 410 within which is displayed a quantity of windows fewer than the quantity of sensors, in the present example a single window 420. In particular, window 420 displays an anthropomorphic representation of a subject individual 430.

In a particular embodiment, separate anthropomorphic representations (software 3-D avatars) would be added to the display window 420 as additional subjects are sensed by the system. This would eliminate the need to display inactive software 3-D avatars and further reduce the complexity of the GUI and amount of information displayed.

In a particular embodiment, a horizontal scroll bar 450 can be displayed in or near the anthropomorphic display window 420 to allow scrolling in cases where the quantity of software 3-D avatar required to depict the quantity of subjects detected exceeds the display width of the anthropomorphic display window 420. The horizontal scroll bar 450 can be displayed continuously or automatically appear only when the required display width is insufficient to display all required software 3-D avatars.

Figure 5:
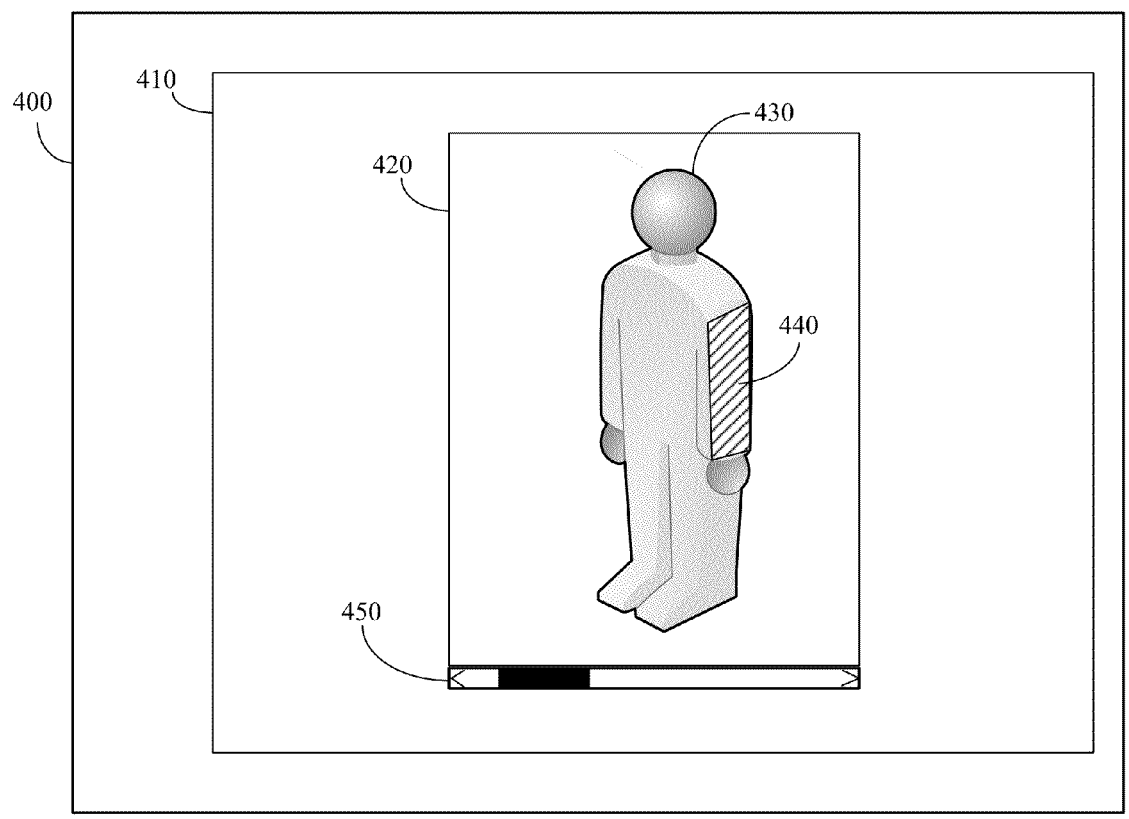
FIG. 5 is a diagram of a particular illustrative embodiment of a GUI incorporating the invention and showing the anthropomorphic display of FIG. 4 with a highlight projecting the algorithmic results determined by one of the sensors of a concealed object.

Referring now to FIG. 5, a particular illustrative embodiment of a graphical user interface generally designated 400 and depicting the anthropomorphic display. The disclosed GUI 400 is comprised of the boundaries of the output device 410 within which is displayed a quantity of windows fewer than the quantity of sensors, in the present example a single window.

In particular, window 420 displays the individual 430 with a computer generated highlight 440 projecting the algorithmic results determined by one of the sensors that a concealed object was detected. The computer generated highlight 440 may include a color, pattern, intensity, density, opaqueness, flash rate, or any combination thereof. In this particular example, the area of the highlight includes the subject's 430 left arm. Accordingly, security may perform a further search of the individual 440 in that particular area to determine whether the concealed object presents a threat (e.g., explosive) that is required to be removed. The anthropomorphic display does not invade the privacy of the individual as the information regarding detection of the concealed object is projected on a representation of a human form rather than a video or image of the actual individual.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of identifying concealed objects using an anthropomorphic display, the method comprising:
    displaying a software 3-D avatar on a visual display when an individual is detected within a scanning area, wherein the software 3-D avatar is an anthropomorphic semi-transparent representation generated independently from a video or image of the individual to protect a privacy of the individual;
    scanning the individual with at least one concealed object detection sensor viewing the scanning area;
    identifying at least one area on the individual in response to detecting a concealed object on the individual; and,
    displaying a computer generated visual highlight at a corresponding location on the anthropomorphic semi-transparent representation itself using a result of the at least one concealed object detection sensor, wherein the visual highlight having at least one of a particular visual attribute that is distinguishable from remaining areas of the anthropomorphic semi-transparent representation;
    wherein the computer generated visual highlight is viewable through the software 3-D avatar to a far side.

2. The method of claim 1, wherein the software 3-D avatar is dimmed, modified with text, graphics, colors, textures, opacity, transparency, or any combination thereof, when no individuals are detected in the scanning area.

3. The method of claim 1, wherein the software 3-D avatar is hidden when no individual is detected within the scanning area.

4. The method of claim 1, wherein the software 3-D avatar is minimized when no individual is detected within the scanning area.

5. The method of claim 1, wherein the computer generated visual highlight includes a color, intensity, density, opaqueness, flash rate, or any combination thereof, to indicate the concealed object was detected on the individual.

6. The method of claim 5, further comprising identifying at least one inconclusive area on the individual where it is uncertain whether the concealed object is present, wherein the inconclusive area is indicated at the corresponding location on the software 3-D avatar using a computer generated contrasting color, intensity, density, opaqueness, flash rate, or any combination thereof.

7. The method of claim 6, wherein the inconclusive area is an area of incomplete sensor coverage, viewing occlusion, partial viewing, obstructions or any combination thereof.

8. A system of identifying concealed objects using an anthropomorphic display, the system comprising:
    a software 3-D avatar to display on a visual display when an individual is detected within a scanning area, wherein the software 3-D avatar is an anthropomorphic semi-transparent representation generated independently from a video or image of the individual to protect a privacy of the individual;
    at least one concealed object detection sensor viewing the scanning area to scan the individual for concealed objects; and,
    a computer generated visual highlight to display at a corresponding location on the anthropomorphic semi-transparent representation itself using a result of the at least one concealed object detection sensor, wherein the visual highlight having at least one of a particular visual attribute that is distinguishable from remaining areas of the anthropomorphic semi-transparent representation;
    wherein the computer generated visual highlight is viewable through the software 3-D avatar to a far side.

9. The system of claim 8, wherein the software 3-D avatar is dimmed, modified with text, graphics, colors, textures, opacity, transparency, or any combination thereof, when no individuals are detected in the scanning area.

10. The system of claim 8, wherein the software 3-D avatar is hidden when no individual is detected within the scanning area.

11. The system of claim 8, wherein the software 3-D avatar is minimized when no individual is detected within the scanning area.

12. The system of claim 8, wherein the computer generated visual highlight includes a color, intensity, density, opaqueness, flash rate, or any combination thereof, to indicate the concealed object was detected on the individual.

13. The system of claim 12, further comprising identifying at least one inconclusive area on the individual where it is uncertain whether the concealed object is present, wherein the inconclusive area is indicated at the corresponding location on the software 3-D avatar using a computer generated contrasting color, intensity, density, opaqueness, flash rate, or any combination thereof.

14. The system of claim 13, wherein the inconclusive area is an area of incomplete sensor coverage, viewing occlusion, partial viewing, obstructions or any combination thereof.

15. A non-transitory processor readable medium having processor instructions that are executable to cause a processor to:
    display a software 3-D avatar on a visual display when an individual is detected within a scanning area, wherein the software 3-D avatar is an anthropomorphic semi-transparent representation generated independently from a video or image of the individual to protect a privacy of the individual;
    scan the individual with at least one concealed object detection sensor viewing the scanning area;
    identify at least one area on the individual in response to detecting a concealed object on the individual; and
    display a computer generated visual highlight at a corresponding location on the anthropomorphic semi-transparent representation itself using a result of the at least one concealed object detection sensor, wherein the visual highlight having at least one of a particular visual attribute that is distinguishable from remaining areas of the anthropomorphic semi-transparent representation;

wherein the computer generated visual highlight is viewable through the software 3-D avatar to a far side.

16. The non-transitory processor readable medium of claim 15, wherein the software 3-D avatar is dimmed, modified with text, graphics, colors, textures, opacity, transparency, or any combination thereof, when no individuals are detected in the scanning area.

17. The non-transitory processor readable medium of claim 15, wherein the software 3-D avatar is hidden when no individual is detected within the scanning area.

18. The non-transitory processor readable medium of claim 15, wherein the software 3-D avatar is minimized when no individual is detected within the scanning area.

19. The non-transitory processor readable medium of claim 15, wherein the computer generated visual highlight includes a color, intensity, density, opaqueness, flash rate, or any combination thereof, to indicate the concealed object was detected on the individual.

20. The non-transitory processor readable medium of claim 19, further comprising identifying at least one inconclusive area on the individual where it is uncertain whether the concealed object is present, wherein the inconclusive area is indicated at the corresponding location on the software 3-D avatar using a computer generated contrasting color, intensity, density, opaqueness, flash rate, or any combination thereof.

* * * * *